United States Patent
Brousseau et al.

(10) Patent No.: US 9,967,349 B2
(45) Date of Patent: May 8, 2018

(54) INTEGRATED SOCIAL MEDIA SERVER AND ARCHITECTURE

(71) Applicant: Open Text SA ULC, Halifax (CA)

(72) Inventors: Paul E. Brousseau, Oakland, CA (US); Wendy S. Cook, Oakland, CA (US)

(73) Assignee: Open Text SA ULC, Halifax, CA (US)

( * ) Notice: Subject to any disclaimer, the term of this patent is extended or adjusted under 35 U.S.C. 154(b) by 218 days.

(21) Appl. No.: 14/496,751

(22) Filed: Sep. 25, 2014

(65) Prior Publication Data

US 2015/0088981 A1 Mar. 26, 2015

Related U.S. Application Data

(60) Provisional application No. 61/882,515, filed on Sep. 25, 2013.

(51) Int. Cl.
| | |
|---|---|
| *G06F 15/16* | (2006.01) |
| *H04L 29/08* | (2006.01) |
| *H04L 29/06* | (2006.01) |

(52) U.S. Cl.
CPC ............ *H04L 67/16* (2013.01); *H04L 67/10* (2013.01); *H04L 67/125* (2013.01); *H04L 67/42* (2013.01)

(58) Field of Classification Search
CPC ....... H04L 67/16; H04L 67/125; H04L 67/10; H04L 67/42; G06Q 10/06
USPC .................................................. 709/203–245
See application file for complete search history.

(56) References Cited

U.S. PATENT DOCUMENTS

| | | | | |
|---|---|---|---|---|
| 2002/0010615 | A1* | 1/2002 | Jacobs | G06Q 10/02 705/7.15 |
| 2003/0088534 | A1* | 5/2003 | Kalantar | G06Q 10/06 706/50 |
| 2003/0130820 | A1* | 7/2003 | Lane, III | G06Q 10/06 702/184 |
| 2004/0254757 | A1* | 12/2004 | Vitale | H04L 43/50 702/122 |
| 2007/0198631 | A1* | 8/2007 | Uhlmann | G06Q 10/06 709/203 |
| 2012/0095926 | A1* | 4/2012 | Nishimura | G06Q 10/103 705/301 |
| 2012/0117144 | A1* | 5/2012 | Douillet | G06F 17/3089 709/203 |
| 2013/0124595 | A1* | 5/2013 | Oplinger | H04L 12/00 709/201 |

(Continued)

*Primary Examiner* — David Lazaro
*Assistant Examiner* — Berhanu Shitayewoldetadik
(74) *Attorney, Agent, or Firm* — Sprinkle IP Law Group

(57) ABSTRACT

Disclosed is a system including a social client and an intermediate server. A social client may be implemented as a mobile application or embedded as a component of a hosted application. The social client may include features/functions for a user to follow, tag, post, and/or comment on a case, a topic, user(s) concerning the case and/or topic, post(s) tagged to a topic, case(s) tagged by the user, or a combination thereof. The intermediate server may serve as an intermediate between backend system(s) and social client(s). For example, the intermediate server may receive a work order from a backend system, place the work order in an event stream and/or a work folder for the user, mark the work order as in-process when the user completes work, and return the work order to the backend system. The backend system may then mark the work order as having been completed.

20 Claims, 11 Drawing Sheets

(56) References Cited

U.S. PATENT DOCUMENTS

| | | | | |
|---|---|---|---|---|
| 2014/0379415 A1* | 12/2014 | Yelisetty | ............ | G06Q 10/0633 705/7.27 |
| 2016/0162172 A1* | 6/2016 | Rathod | .............. | G06Q 3/04847 715/747 |

* cited by examiner

INTEGRATED SOCIAL MEDIA SERVER AND ARCHITECTURE

CROSS REFERENCE TO RELATED APPLICATION(S)

This is a conversion of, and claims a benefit of priority under 35 U.S.C. § 119 from U.S. Provisional Application No. 61/882,515, filed Sep. 25, 2013, which is hereby incorporated by reference as if set forth herein in its entirety, including all appendices attached thereto.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to enterprise systems such as case management systems. More particularly, embodiments disclosed herein relate to an integrated social media system for use with backend systems.

BACKGROUND

Today, an enterprise may use various backend systems to improve the performance of their organization. Examples of such backend systems may include workflow systems, business process management (BPM) systems, and case management systems. While workflow systems and BPM systems concentrate on the process of doing the work, case management systems focus on information associated with the work.

In this context, a "case" is a compendium of information, processes, analytics, rules, and collaboration that relate to a particular interaction with or issue involving a particular party such as a household, customer, supplier, patient, student, or defendant. Accordingly, a case file may include customer communications, forms, process documents, reports and supporting documentation, etc., all of which will be accessed over the length of time the case is being worked on and will need to be managed for compliance and audit. Case management, therefore, involves operating on bundles of content rather than individual documents or images.

Document management systems such as enterprise content management (ECM) systems or document management (DM) systems may be used for managing case documents. However, these systems take a single document view and may involve moving a given document through each process stage, perhaps serially. Furthermore, these systems lack the functionality and flexibility needed to deal with case management. For example, case managers may need to monitor and manage progress in cases involving collaboration inside and/or outside the enterprise. However, backend systems often lack integrated tools for frontend collaboration.

SUMMARY

Embodiments disclosed herein can bridge the gap between backend enterprise-centric systems and frontend user-centric collaboration tools. As will be discussed in greater detail below, in some embodiments, the inventive systems and methods described herein may include social interaction tools and techniques that may work in concert or be integrated with backend systems to direct, facilitate, control, and aid in completion of an enterprise's work related needs. These social interaction tools, which may also be referred to as interactive tools, may facilitate social contact between and amongst individuals and their organizations via various features and/or functions. Coupled to or integrated with enterprise backend systems and applications, these interactive tools may facilitate the initiation, processing, control, and completion of work tasks. For example, in some embodiments, the inventive system and methods can aid in the processing, control, and completion of sub-task and/or sub-steps of a case, a project, an assignment, a workflow, a process, a job, or the like.

In some embodiments, a system may include a social client module and intermediate server. The social client module may implement a set of interactive tools having a plurality of features and/or functions and may be communicatively connected to the intermediate server. The intermediate server may be communicatively connected to one or more backend systems and serve as an intermediate between the one or more backend systems and the social client module. For instance, the intermediate server may instantiate a work post based on data received via the social client module and may notify a handler of a backend system about the work post. The handler may create a work item associated with an enterprise application hosted on the backend system based on the work post created by the intermediate server. The handler may initiate a process for an instance of the hosted enterprise application to run on a client device. The social client module may be one of a plurality of social client modules running on various types of client devices.

In some embodiments, the social client module may be implemented as a mobile application that operates independently of the hosted enterprise application. In some embodiments, the social client module may be embedded as a user interface component or function of the hosted enterprise application or otherwise integrated as part of the hosted enterprise application.

In some embodiments, the work post created by the intermediate server is associated with a case having a unique identification assigned by the backend system. The data from the social client module may contain a reference to the unique identification of the case.

In some embodiments, the set of features and/or functions provided by the social client module may include one or more functions for a user to follow, tag, post, and/or comment on a case, a topic, user(s) concerning the case and/or topic, post(s) tagged to a topic, case(s) tagged by the user, or a combination thereof.

In some embodiments, the intermediate server may manage tags associated with work posts for a case managed by an application hosted on a backend system. In some embodiments, the intermediate server may receive a work order from a backend system, place the work order or cause the work order to be placed in an event stream and a work folder for the user, mark the work order as in-process when the user completes work, and return the work order to the backend system. The backend system may then mark the work order as having been completed.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
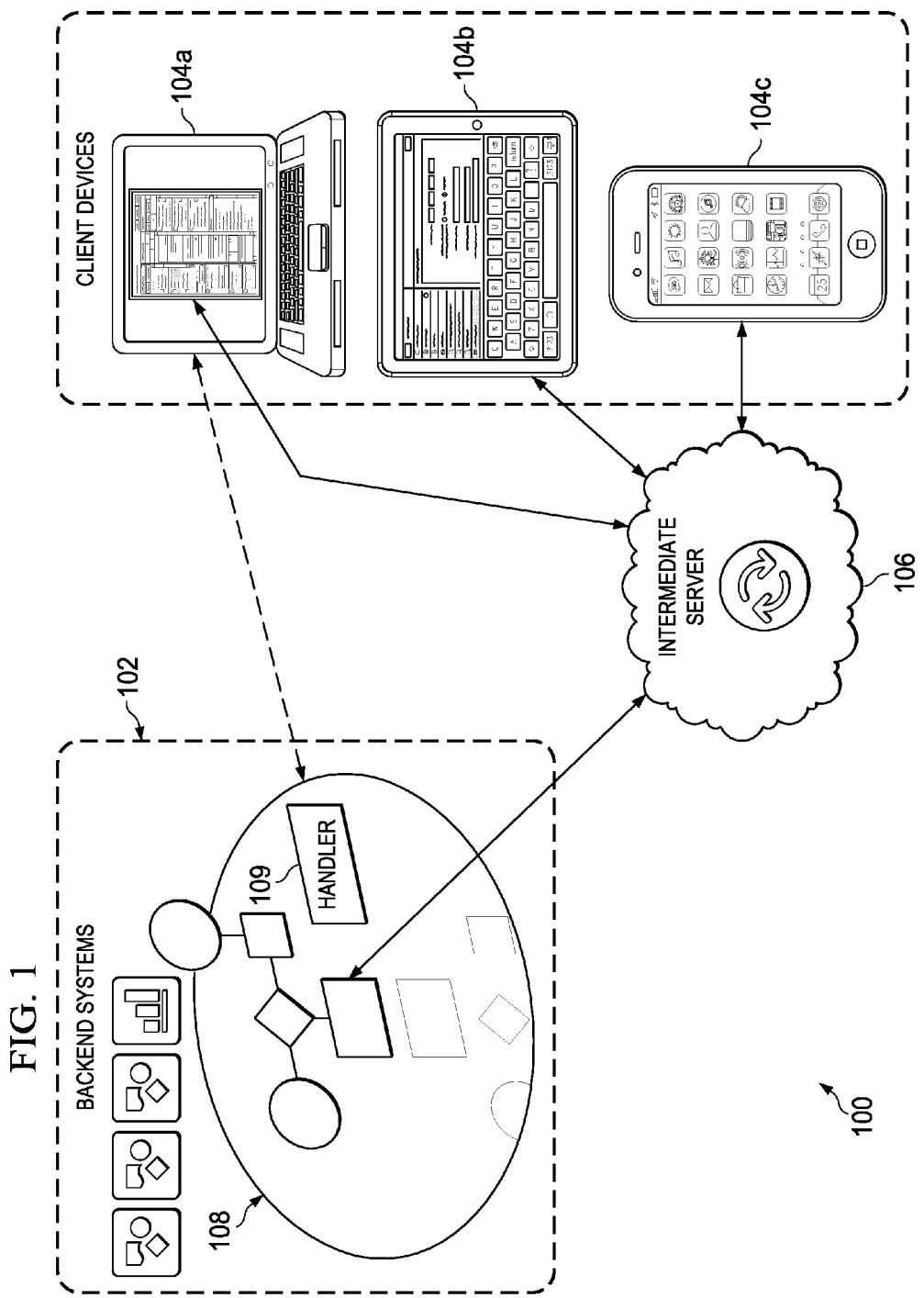
FIG. 1 depicts a diagrammatic representation of an exemplary network computing environment where embodiments disclosed herein may be implemented.

Turning now to FIG. 1, a diagram illustrating exemplary network computing environment 100 according to some embodiments disclosed herein is shown. Network computing environment 100 may include backend systems 102 (also referred to herein as source systems), intermediate server 106, and client devices 104a-104c. Intermediate server 106 may provide feeds through which users of client devices 104a-104c can choose to follow people and topics, and a user's feed or event stream will show posts tagged for those people and topics. Intermediate server 106 is distinctive in that it can augment enterprise backend systems such as process management, workflow management, project management, and case management systems. Intermediate server 106 may be used to follow work in these systems, for example, to monitor the status of a particular case. Such posts are also extensible—in addition to the usual post messages, posts in embodiments disclosed herein may have associated extensions that a backend system may use to interact with a user. For example, an insurance claim process system might use an approve/reject extension to send a supervisor a post that includes approve and reject buttons that the supervisor can use to approve a claim request.

As will be explained in greater detail below, intermediate server 106 may provide enterprise users such as case workers with enhanced engagement with their work in a variety of ways:

Following: In some embodiments, users can subscribe to any or all changes in a case—case events, tasks, or metrics—and receive updates via their personalized feed stream.

Micro-participation: In some embodiments, users can perform simple case tasks, such as approvals, quick data capture, or process initiation, via "bite-sized" interactions on a mobile device, which may represent smaller sub-tasks/sub-steps associated with an overall task or series of steps.

Collaboration: In some embodiments, case workers can easily consult and collaborate with members of their social network through comments, threaded discussions, and posts.

Case processing: In some embodiments, a case folder interface is provided that includes an integrated event stream.

Intermediate server 106 may be on-premises (e.g., reside within an enterprise's computing environment) or cloud-based (e.g., hosted in a cloud) and may communicate with backend systems 102. Hosting intermediate server 106 in a cloud may allow features and/or functions to be added rapidly. To support this, intermediate server 106 may be configured to support multiple tenants, and to take advantage of the cloud where appropriate, but not to rely on it, so that intermediate server 106 may still be used independently of the cloud. One example of a suitable cloud is the OpenText cloud provided by Open Text.

Backend systems 102 may run on one or more server machines and may be used to manage processes, work, cases, projects, jobs, assignments, etc. Exemplary backend systems may include, but are not limited to, Process 360, Case 360, and Business Process Management (BPM) systems manufactured by Open Text. Client devices 104a-104c may include laptop and personal computers, tablet devices, smartphones, mobile computing devices, and the like.

As will be explained in greater detail below, client devices 104a-104c may include mobile applications that implement social client modules having interactive tools with various features and/or functions. In some embodiments, intermediate server 106 may receive data from a social client module and create a work post using data received from the social client module. At the backend, each backend system 102 may have control logic 108 including a handler 109 configured to communicate with intermediate server 106 and other components of individual backend system 102. Intermediate server 106 may notify handler 109 of the work post so that handler 109 can utilize the work post to create a work item for backend system 102 (e.g., in the appropriate form or format that can be consumed, processed or otherwise handled by other components of backend system 102). In some embodiments, the work post may be created by intermediate server 106 in response to receiving data from handler 109 on behalf of a particular backend system 102. The work post, in this case, may contain data from the particular backend system 102. In turn, intermediate server 106 may determine, based on the data from the particular backend system 102, to what client device(s) the work post should be sent and send the work post to social client module(s) running on those client device(s).

In this way, intermediate server 106 can provide users with a new way to follow, join, tag, share, and track discussions relating to, or even initiating the creation of, a particular work, project, case, workflow, job, assignment, etc. (collectively referred to hereinafter as the "work"). Intermediate server 106 can provide them with unified access to events and data associated with the work, significantly improving their engagement with the work at hand.

Figure 2:
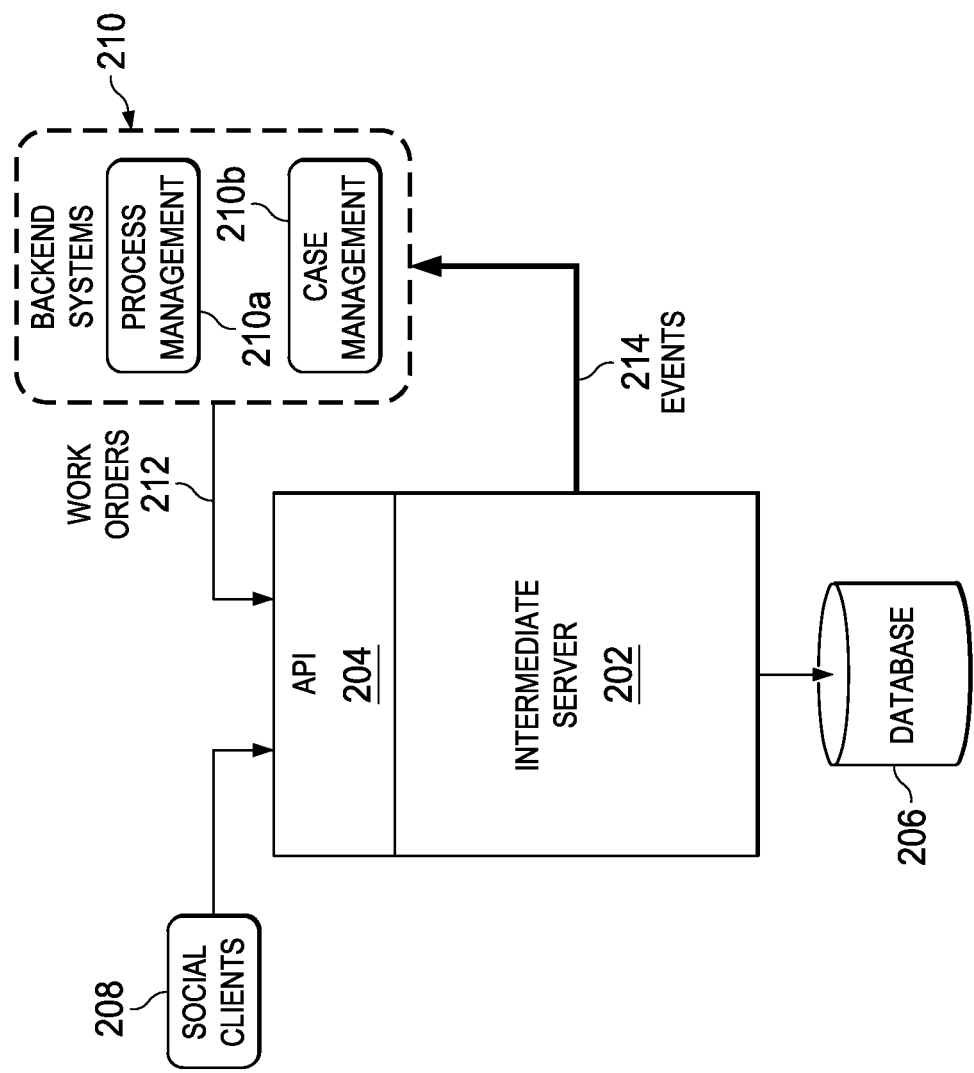
FIG. 2 depicts a diagrammatic representation of an example system architecture according to some embodiments disclosed herein.

FIG. 2 depicts a diagrammatic representation of an example system architecture according to some embodiments disclosed herein. As shown in FIG. 2, intermediate server 202 may interface with backend systems 210 (which may run on one or more server machines at the backend) and social clients 208 (which may run on various client devices) via Application Programming Interface (API) 204. API 204 provides backend systems 210 and social clients 208 with access to intermediate server (e.g., information stored in database 206 concerning posts, people, tags, topics, etc.). Backend systems 210 may use the API to tag specific posts with work identifiers. A work identifier may associate a post with a specific work item or case. Example APIs and access control mechanisms are provided below with reference to FIG. 3. As those skilled in the art can appreciate, various access control mechanisms may be utilized.

Intermediate server 202 manages posts. Some posts are work posts that have a work order attached to it, in addition to post content and attachments. A work order has a work form. When social client 208 displays a post with a work order to a user, it will render the form for the user. Social client 208 may collect the user's input to the form and send the user input back to intermediate server 202. In one embodiment, within intermediate server 202, a work post may have a post handler (e.g., via a handler class) associated with it, which can provide custom logic to act on the work order response, for instance, to communicate with backend systems 210.

As shown in FIG. 2, backend systems 210 may include various enterprise applications such as process management system 210a and case management system 210b. Backend systems 210 may generate work orders 212 associated with a work and communicate same to intermediate server 202. Intermediate server 202 may communicate events 214 associated with work orders 212 to backend systems 210 (via appropriate handlers such as handler 109 shown in FIG. 1). Intermediate server 202 may store various data associated with work orders 212 and events 214 in database 206. Those skilled in the art will appreciate that database 206 may comprise one or more databases.

As a specific example, a work order may be generated by case management system 210b for a particular case. The work order includes a unique identification assigned by case management system 210b that identifies the particular case (a case identifier, a work identifier, or the like). A handler of case management system 210b may communicate the work order to intermediate server 202. In response, intermediate server 202 may create a work post and associates it with the unique identifier. This is done because social clients 208 may not be compatible or able to understand or process the work order directly from case management system 210b. Indeed, in some embodiments, social clients 208 may be distinct from and/or completely independent of case management system 210b. Intermediate server 202 may send the work post to selective social clients 208. This process is further described below.

Backend systems 210 can integrate with intermediate server 202 through API 204. API 204 may provide access to intermediate server components, primarily posts, people, and topics, and may control this access to ensure people only see those topics and posts they have permission to see.

The level of integration can vary from implementation to implementations. Non-limiting examples may include:

Social panel, web part, or widget: Backend systems can implement a panel in their hosted application with functionality similar to the social client application. This panel, which is powered by an embedded social client module, would give users easy access to posts from within their enterprise application, so that users can follow interesting topics and people, and post questions to get advice to help them with their work.

Work id tags: Backend systems may use an API such as a REST API to tag specific posts with a work identifier that associate the posts with a specific work item or case. REST APIs are known to those skilled in the art and thus are not further described herein. This work id tag can later be used to look up all posts associated with that case. Backend systems may use this tag to display related social posts whenever a user opens a case. Conversely, when the user is monitoring their event stream in the social panel of a hosted application, the hosted application could be wired to open the associated case when the user clicks on a work id tag in a social post.

Event notifications: Backend systems can use the API to post status messages to intermediate server topics and/or tag them with work ids so that users following the topics or work will be able to monitor what's happening with this work.

Task or action participation: Backend systems can use the API to post messages to the social server to request help in completing business tasks or actions. This might be a regular post asking a field worker to reply with an updated photo or an answer to a question. Moreover, a backend system may use post extensions to send a more specific request, with approve/deny buttons, a checklist of to-do items, or a form to be filled out. The backend system can register event handlers to receive events from the intermediate server when a user responds to these posts, or any other posts the backend system may want to monitor and handle programmatically.

Work initiation: If a backend system is configured to support initiation of work from user posts, it can use event handlers to monitor a work-initiation topic and create a case or process instance when a post is added to that topic. The backend system may want the user to enter specific data when initiating work. For example, for a trouble ticket initiation, the backend system might want the user to provide some basic information about what kind of problem they are experiencing. To support this, topics may have associated post extensions assigned to them that will be added to any new post created for that topic. This can be used to associate a form or multiple-choice question with the topic so that the backend system will have some standard information to include in the new case.

Figure 3:
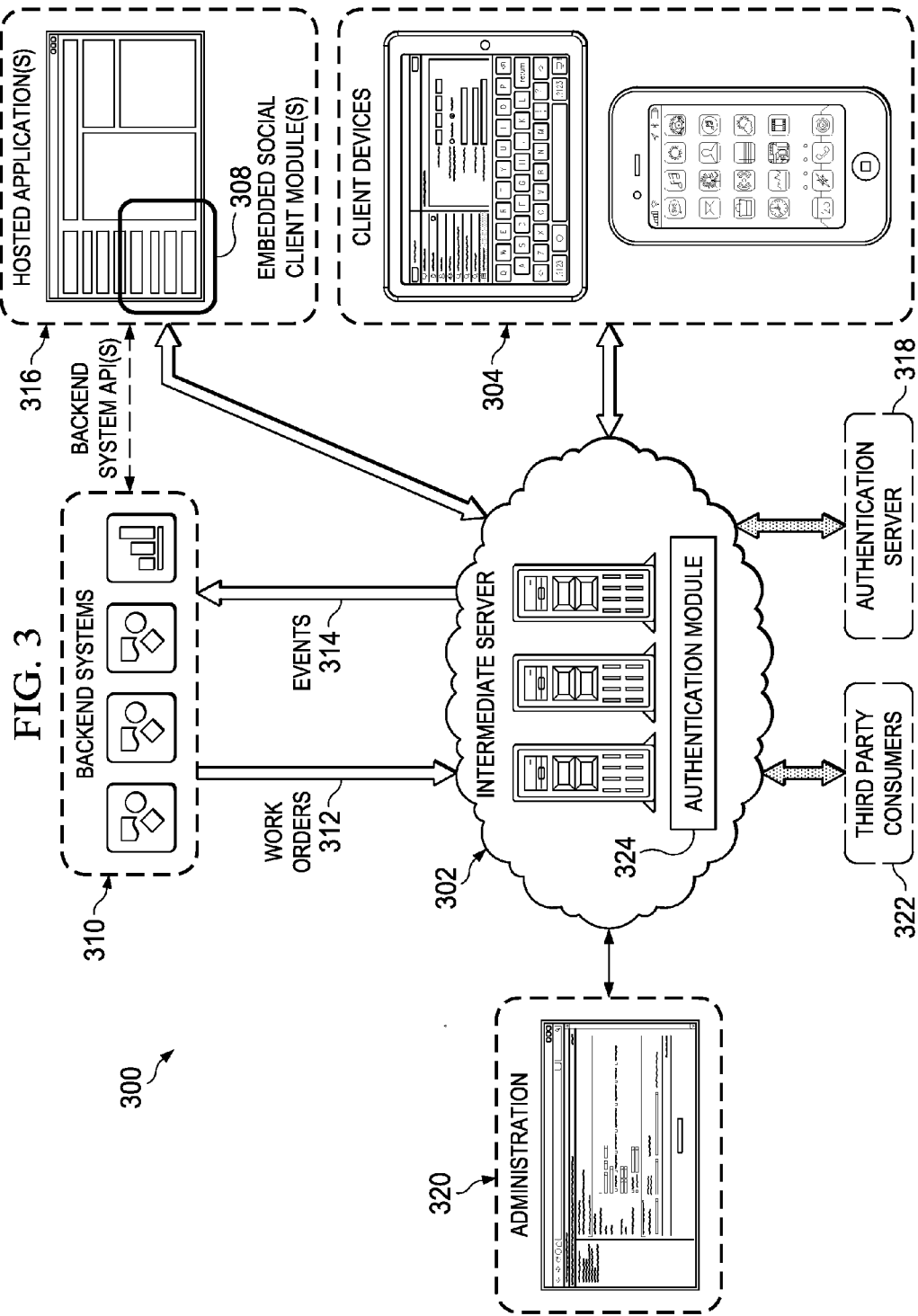
FIG. 3 depicts a diagrammatic representation of an example system architecture according to some embodiments disclosed herein.

FIG. 3 depicts a diagrammatic representation of another example system architecture according to some embodiments disclosed herein. In FIG. 3, intermediate server 302 may be communicatively connected to backend systems 310 operating in network computing environment 300. As illustrated in FIG. 3, in some embodiments, intermediate server 302 may implement a cloud-based system running on one or more server machines and may implement a federated authentication mechanism including authentication module 324. For example, intermediate server 302 may establish a trust with authentication server 318 (e.g., via certificates issued by Active Directory Federation Services (ADFS), Lightweight Directory Access Protocol servers, etc.) and redirect unauthenticated requests from any client (e.g., social client modules running on client devices 304 or embedded social client modules 308 of hosted applications 316), so that they may authenticate without intermediate server 302 having to manage user passwords. Once they are authenticated, intermediate server 302 may then grant access to the requested information.

Note that hosted applications 316 may run on various devices that are considered by backend systems 310 as client devices. Such hosted applications 316 may communicate with backend systems 310 via backend system APIs. However, backend systems 310 and intermediate server 302 may not have the same clients, although there may be some overlap (e.g., a device that runs a hosted application 316 of a backend system 310 may be considered a client device of intermediate server 302 if that device also runs a social client module or if hosted application 316 includes embedded social client module 308).

Intermediate server 302 may receive work orders 312 from backend systems 310 (e.g., via an API such API 204 shown in FIG. 2) and may send events 314 associated with work order 312 to backend systems 310. Events 314 may be caused by user actions at client devices 304, as explained below.

In some embodiments, intermediate server 302 may include administration interface 320 through which various functions of intermediate server 302 may be configured. Additionally, in some embodiments, intermediate server 302 may be communicatively connected to third party consumers 322 (e.g., users who are not employees of an enterprise and/or who have no access to backend systems 310). Third party consumers 322 may receive feeds such as Really Simple Syndication (RSS) feeds from intermediate server 302.

Figure 4:
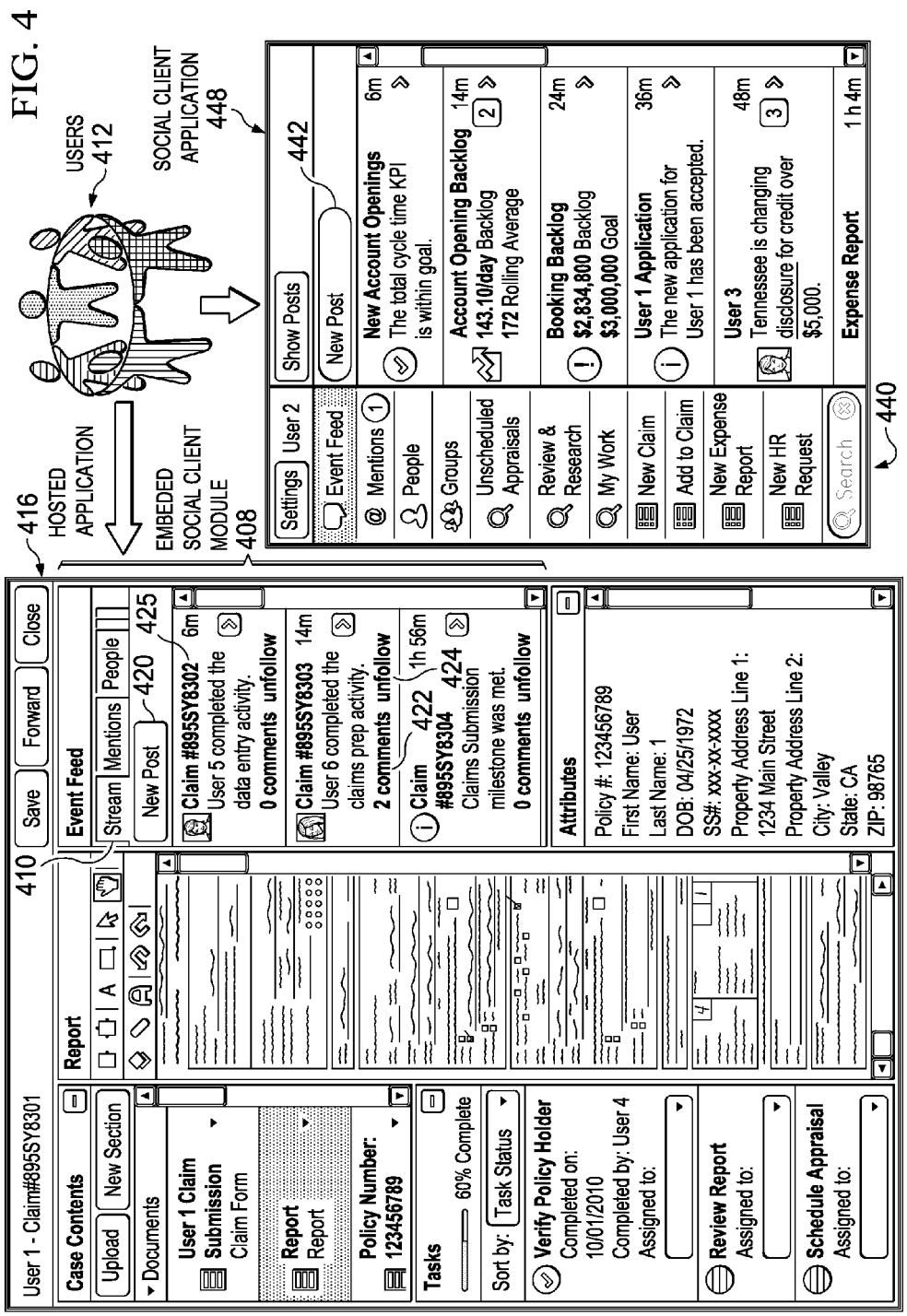
FIG. 4 depicts a diagrammatic representation of example embodiments of different types of social client modules.

FIG. 4 is a diagrammatic representation of example embodiments of different types of social client modules. As shown in FIG. 4, embodiments of an intermediate server disclosed herein may support hosted application 416 with embedded social client module 408 and social client application (social client module) 448. Hosted application 416 may be hosted by (an instance of) a backend system described above. In the example of FIG. 4, the backend system may be a case management system. Embedded social client module 408 may be integrated with hosted application 416 such that events related to a case may be processed directly into the respective case folder maintained by the case management system running at the backend.

Embedded social client module 408 may include a plurality of features and/or functions accessible via tabs 410. Each tab may further include one or more sub-features and/or functions, such as New Post 420, comments 422, and follow/unfollow 424, through which users 412 can post to a thread or stream pertaining to a particular case, comment on a particular case, and/or follow or unfollow a particular case. Other features and/or functions may also be included.

Likewise, social client application 448 may include a plurality of features and/or functions accessible via buttons or controls 440. Each function or feature may further include one or more sub-features and/or functions, such as New Post 442. Hosted application 416 and/or social client application 448 may run on different devices or on the same device.

Because social client application 448 is lightweight, it can be implemented, in some embodiments, as native iPhone/iPad and Android applications without too much additional overhead. This allows social client application 448 to provide a richer user experience that is consistent with users' expectations for their devices, and also allow social client application 448 to take advantage of device features such as the camera for attaching photos to a post. A native application also lends itself to allowing the user to work even while their mobile device is disconnected from the server.

In some embodiments, a hybrid approach that supports post extensions may be implemented. In such embodiments, social client application 448 may have knowledge as to how to display a basic, pre-defined set of post extensions natively. For example, social client application 448 can display a set of buttons in a post for simple selections such as approve/deny. This hybrid approach can support an additional option for backend systems to define their own custom extensions. This can be done in a generic way that does not require code changes to social client application 448. In one embodiment, HTML5 is used for these extensions. Specifically, social client application 448 can use a browser panel to display the HTML5 extension defined by a backend system. This gives backend systems flexibility in the extensions they can define and it lets them do it in a way that can be reused on any mobile device.

Furthermore, in some embodiments, a hybrid native/web application framework may be implemented. One example of a suitable hybrid native/web application framework may be the Open Text Application Gateway (OTAG) manufactured by Open Text. In such embodiments, social client applications 448 may be deployed to and managed on client devices through the OTAG and social client applications 448 may communicate with backend systems via the OTAG where an embodiment of an intermediate server resides. In one embodiment, social client applications 448 may be HTML5 compliant.

As noted above, there can be various types of backend systems. However, it may be helpful to provide a non-limiting example in the context of case management. In some embodiments, a case management system running at the backend in an enterprise computing environment may create a work order. The work order may be created for various reasons, for instance, certain documents that are needed for a case are missing.

Within this disclosure, a "case" refers to an individual work item defined by a backend system (also known as a work packet, folder, case, process instance, etc.). Following the above example, therefore, the work order generated by the case management system is associated with a particular case in the case management system. The case management system is responsible for creating the case and assigning a unique display name to the case.

In some embodiments, an intermediate server (e.g., intermediate server 202 described above with reference to FIG. 2) may interact with the case management system and (independent or embedded within a hosted application) social clients (e.g., social clients 208 shown in FIG. 2) to facilitate the processing, control, and completion of the work order. For example, the work order may include a form with instructions to attach and upload certain documents. The intermediate server may create a work post that includes the form and instructions and send the work post to an individual or topic for action. The work post may be placed in an event stream or event feed, as shown in FIG. 4. The recipient or topic subscriber sees the work post in both their stream and in the backend process's work list 402.

For the sake of clarity, the term "work post" is used in this disclosure to refer to posts generated by the intermediate server as opposed to user posts created by users. However, users may not be able to (or need to) distinguish the different types of posts displayed in their event feeds (streams).

Continuing with the above example of case management, because the intermediate server is not part of the case management system, it does not need to enforce the association between the work order and the case. Furthermore, the intermediate server may process non-work related requests (e.g., purely social) that do not correlate to a particular case. From the perspective of the intermediate server, a case may be a distinct entity comparable to a person or topic (whether it is work related or non-work related). As with people and topics, users can search for cases, and access the posts associated with the individual case.

The unique display name assigned to the case by the case management system can be used as a tag name (e.g., Claim #895SY8301 shown in FIG. 4). This allows users to distinguish between cases.

In some embodiments, users of social client applications do not define cases. They may create posts which will initiate creation of work items. However, it is the case management system at the backend that will create a case and assign a unique display name to the case. Once a case is defined, mobile users may tag a post to associate it with that case.

Specifically, when a case is created, the case management system may define:
case detail information, including unique display name, picture, description, and attributes;
definitions of topics to create for the specific case; and
access permission for the case such as public, private, and semi-private. Security around a case may be defined on the "case definition", which may be implemented as a template or set of metadata which helps define actual instances of a case. In some cases, all cases may be associated by exactly one of the case definitions in the case management system. Further, case ydefinitions may be created by administrative-type users of the case management system.

A case may have a set of topics associated therewith. The set of topics is not fixed. The case management system may define a different set of topics for each individual case. Defining a topic to associate with a case includes defining access permission for the topic (public, private, or semi-private), and defining the set of people who have access to the topic. In some embodiments, no topic is automatically associated with or created for a specific case. A case definition may have a collection of topics associated with it, but this association is not automatic or mandatory. In some cases, the intermediate server may use this set of default topics to suggest to a user (via a social client application or social client module embedded within a hosted application running on the user's device) a topic or group of topics which may be tagged when that user is creating a post associated with that case. This tagging is not mandatory, and the end user may "untag" the topic(s).

In some embodiments, the intermediate server may support multiple groups (or roles) of people. In some embodiments, users are automatically associated with a group based on information received from an authentication server (e.g., an ADFS system). For example, if the information received from an authentication server identifies a person as a member of an engineering group, the intermediate server may automatically associate that person with the engineering group. In this way, group membership may be automated. Other implementations may also be possible. For example, a group's membership may be either manually specified or automatically specified. Groups with manually specified memberships may also contain other groups (manual or automatic) as members. In addition, in some embodiments, rights may be established on a case definition (and therefore, the individual cases) based on group membership.

In this way, the case management system at the backend does not need to supply a complete list of individual users for each case. What is more, whenever team members of a group change, the case management system does not need to update all existing individual cases to change the topic permissions on each.

Referring to FIG. 4, a search function may be provided (as part of tabs 410 or controls 440) so that users 412 may search for people, topics, cases, etc. For cases, the list of cases a user sees may show the case display name (for example, Claim #895SY8302). When the user picks a case, he would see case details. From a details page, the user could click to see the posts for that case. This will show the user all posts in all of the case's topics that the user has access to. For example, if the case is defined to have a single private topic that is accessible to everyone in a claims processing department (per membership to the "claims processing department" group), then when someone from the claims processing department clicks on posts for the case, they will see all of the posts. If someone outside of the claims processing department clicks on posts for that same case, they will not see any posts.

In some embodiments, there may be one or more options for the list of cases to display in the search list, such as:
a. all cases; or
b. only cases the user has access to, based on access permission defined for the case.

In some embodiments, when a user selects a case from the search list, the case details they will see will be the detail information provided by the case management system at the backend as defined when the case was created. Case details may include information such as:
picture (photo/icon);
case type;
case identifier (human-readable unique identifier for the case, e.g., Claim #895SY8302);
description;
attributes defined by the case management system for the case;
posts;
following;
followers; or
a combination of the above.

In some embodiments, anyone who can access a case may tag a post for that case. A case tag associates a post with a case. When a user clicks on a case tag, the user is directed to case details for that case. For example, when user 412 clicks on case tag 425 for Claim #895SY8302, the user's clicking action (event) is sent to the intermediate server along with the case tag which contains a reference to the case. Following the above case management example, the intermediate server communicates this event to the case management system at the backend (via a handler such as handler 109 described above with reference to FIG. 1) which, in turn, causes the case to open within hosted application 416 and display a page with case details for that case.

In some embodiments, anyone with access to a case may follow the case. Additionally, users may follow a person or a topic associated with the case.

In some cases, a case may follow another case. Each case may include a stream, with all the posts associated with the case and any case(s) that the case is following. This feature might be used to reference an example case that users can use to see how to handle a particular kind of case, or it might be used to reference a related case. For example, if a trouble ticket case is opened, and that results in starting a service request case, then the trouble ticket case can be configured to follow the service request case (and vice versa, if necessary). In some embodiments, a case might have two tabs—one for the case posts, and one for the case's stream.

Figure 5:
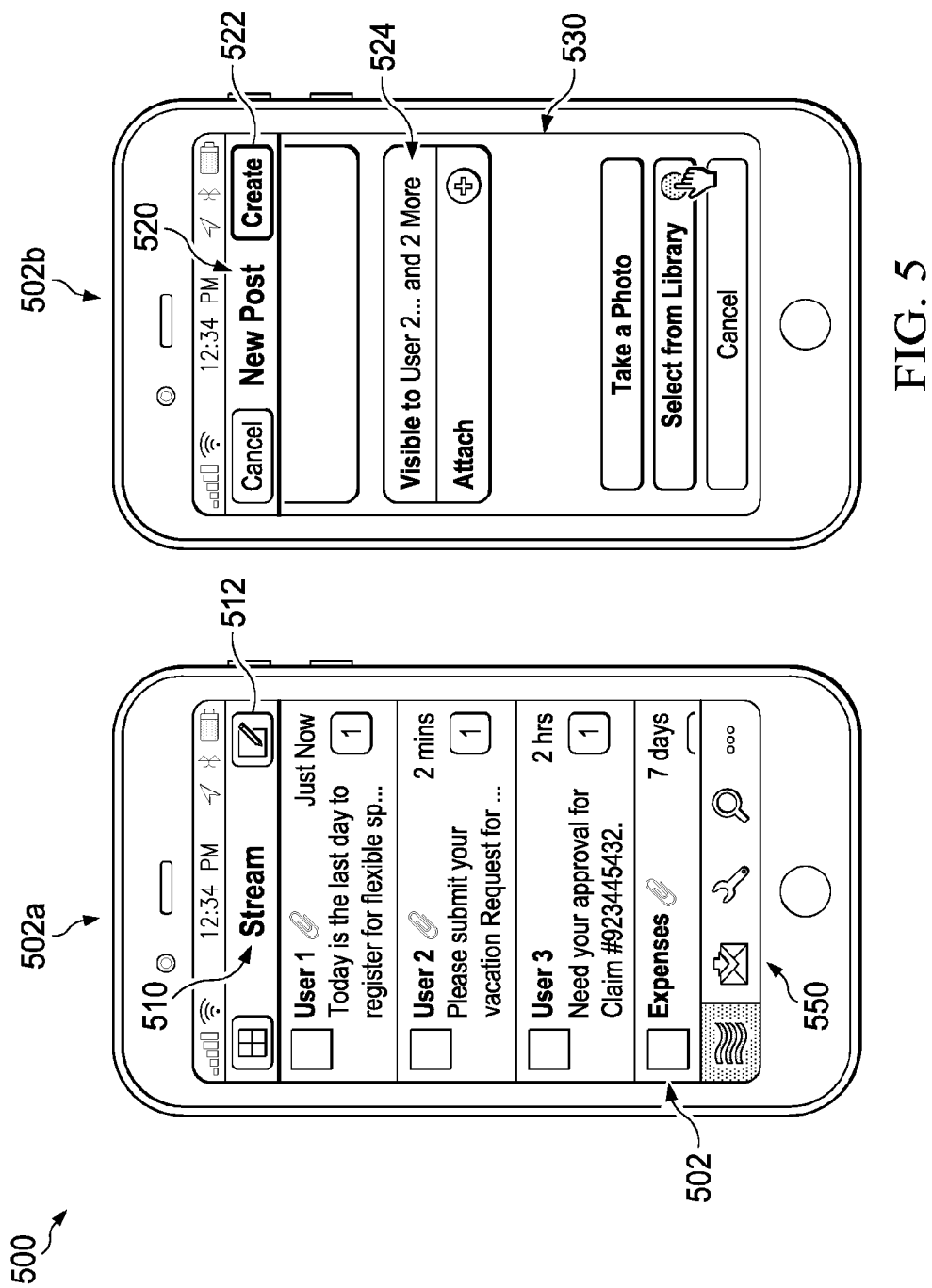
FIGS. 5-6 depicts example capabilities of a social client application according to some embodiments disclosed herein.
Figure 6:
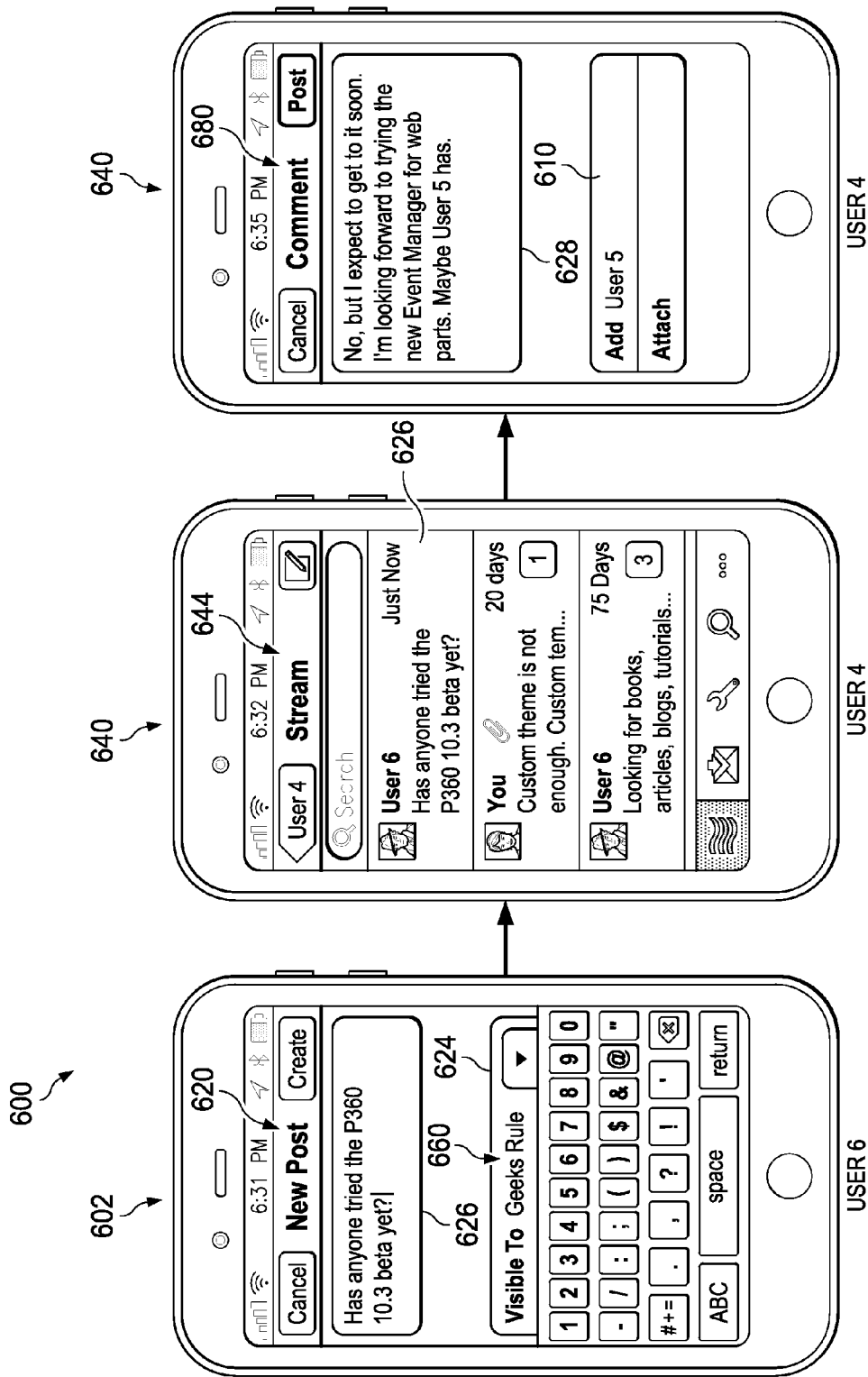

FIGS. 5-6 illustrate by example some embodiments of a social client module running on a client device such as a smartphone. In FIG. 5, the social client module is implemented as social client application 500. Specifically, FIG. 5 depicts example interfaces 502*a* and 502*b* of social client application 500. As illustrated in FIG. 5, social client application 500 can be configured to present event stream 510 via interface 502*a*. In some embodiments, an event stream may be associated with a particular topic, case, etc. In this example, event stream 510 may show user posts from User 1, User 2, User 3, etc. and work posts from a backend system (e.g., Expenses 502). Additionally, social client application 500 may include a plurality of menu items 550 associated with various functions such as messaging, settings, search, etc. as well as navigational controls such as New Post button 512.

Selection of New Post button 512 will cause interface 502*b* of social client application 500 to be displayed, allowing a user to use New Post creation functionality 520 of social client application 500 via interface 502*b*. As shown in FIG. 5, social client application 500 may further include a plurality of sub functions 530 associated with New Post creation functionality 520. For example, visibility control 524 may allow the user to specify how the new post may be viewed (e.g., by whom, what group, what topic, what case, how long, etc.). User(s), group(s), topic(s), case(s), etc. thus specified may be considered "tagged" or otherwise associated with the new post. Other sub functions 530 may allow the user to access data stored on the client device and/or device functions such as taking a photo via the client device's camera function.

Selection of Create button 522 of New Post creation functionality 520 will cause social client application 500 to package the new user post and communicate same to an embodiment of an intermediate server described above. In response, the intermediate server may place the new user post in event streams of user(s), topic(s), case(s), etc. as specified by the user. The intermediate server may also create a work post based on the information received from social client application 500 and communicate same to a handler of a backend system as described above. The handler, in turn, may create a corresponding work order that can be processed by the backend system. This allows the backend system to take appropriate action based on user interaction with social client application 500.

As the above example illustrates, social client application 500 can be installed and run on the client device independently of any backend system and yet can keep the user of the client device informed of events relevant to the cases in the backend system that the user is working on and allow the user to interact with the cases and/or people working on those cases in a timely and convenient manner. In this way, social client application 500 can help extending the reach of a backend system to participants who might not normally use the full enterprise application hosted by the backend system.

As a specific example, the new user post may contain a request to initiate a new case. The intermediate server may create a work post regarding same and send the work post to the handler. The corresponding work order thus generated by the handler may be stored by the backend system and forwarded to a case manager for approval of creating a new case. The case manager may view the work order via the backend system or the new user post concerning same via an embedded social client module within a hosted application and/or a social client application.

FIG. 6 illustrates another example in which some embodiments disclosed herein can be utilized as a social collaboration tool. In this example, a social client module is implemented as social client application 600 running on a client device such as a smart phone. With social client application 600, a user can follow a topic and posts tagged to that topic will appear in an event stream. In the example illustrated, User 6 creates new post 626 using New Post functionality 620 of social client application 600 running on client device 602. User 6 also specifies, using visibility control 624, that the new post should be visible to topic 660 ("Geeks Rule"). Accordingly, the new post will appear in the event streams of those who follow topic 660. In this case, User 6 is asking if anyone has tried a new software release. Suppose User 4 is a follower of topic 660 and sees user post 626 in event stream 644 via social client application 600 running on client device 640. As shown in FIG. 6, User 4 may select post 626 and comment on post 626 via comment functionality 680 of social client application 600. In creating post 628, User 4 may add (tag) User 5 to get his input on post 626 by User 6, using sub function 610 of comment functionality 680. Other sub functions may also be possible. For example, User 4 may attach an image or other supporting documentation. In some embodiments, whether or not User 5 is also a follower of topic 660, User 5 will be included in the thread.

The examples described above illustrate the following, posting, commenting, tagging, and event streaming capabilities of a social client (whether implemented as an embedded component of a hosted application or an independent network application) according to some embodiments. In some embodiments, additional capabilities may include approvals, voting, and escalation to process (e.g., initiation of a work order by a user). Voting may be implemented as a specific use-case for a work order directed at a multitude of people. Programming techniques necessary to implement these capabilities are known to those skilled in the art and thus are not described herein.

Example operations of embodiments disclosed herein will now be described with reference to FIGS. 7-9, which show backend system 702 having handler 709, intermediate server 706, and client devices 704*a*, 704*b*, and 704*c* operating in network computing environment 700.

Figure 7:
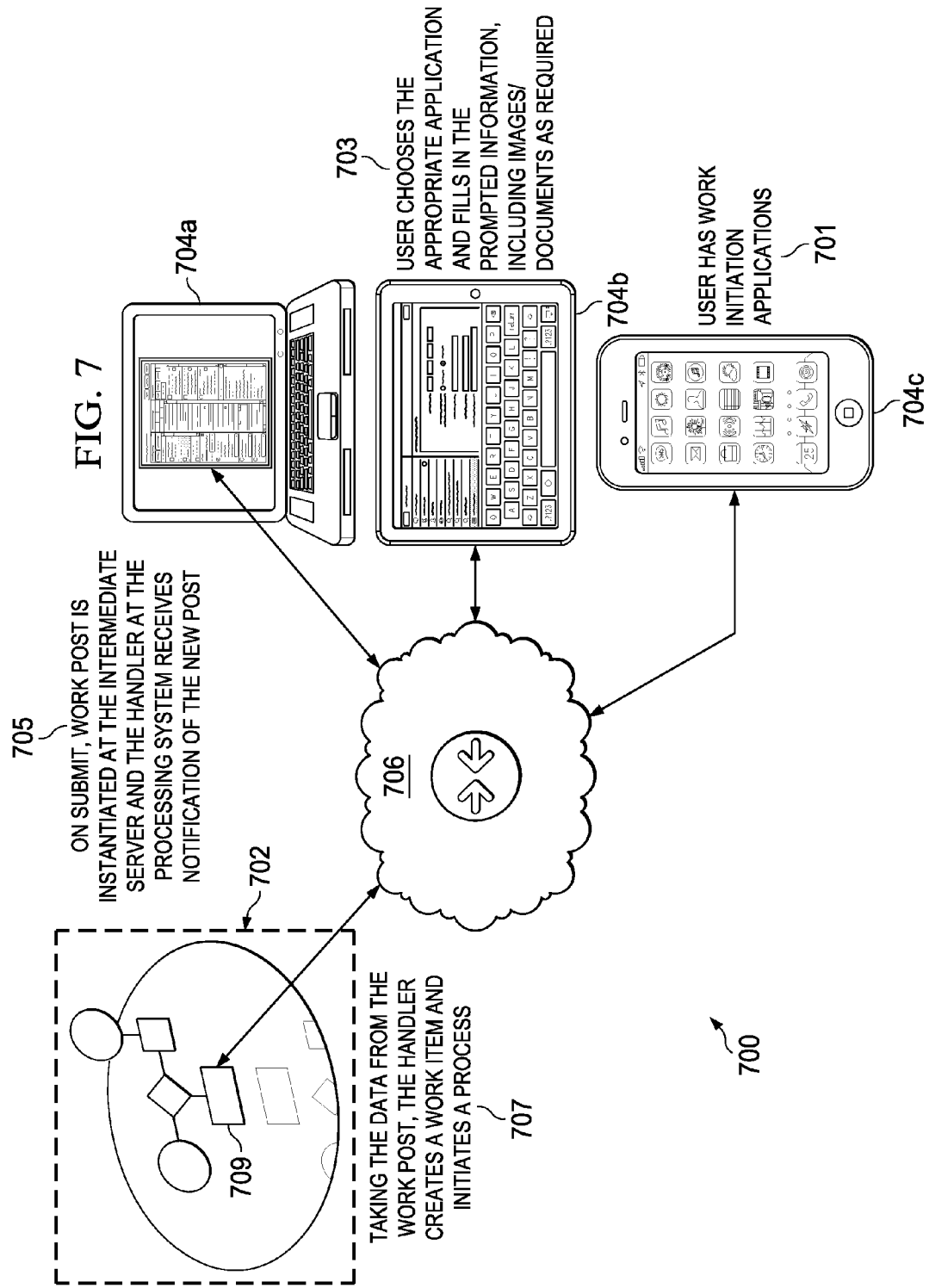
FIGS. 7-9 depict diagrammatic representations of example operations according to some embodiments disclosed herein.

On the frontend, as shown in FIG. 7, a user may employ one or more of the client devices 704a-704c, which may have a set of work initiation applications, as shown at 701. At 703, the user may choose an appropriate application and fill in the prompted information (e.g., via a form), including images/documents as required. At 705, submission from the user may cause initiation of a work post by intermediate server 706. Intermediate server 706 may notify handler 709 of the work post. At 707, handler 709 may take the data from the work post, create a work item, and initiate a process to process the work item.

Figure 8:
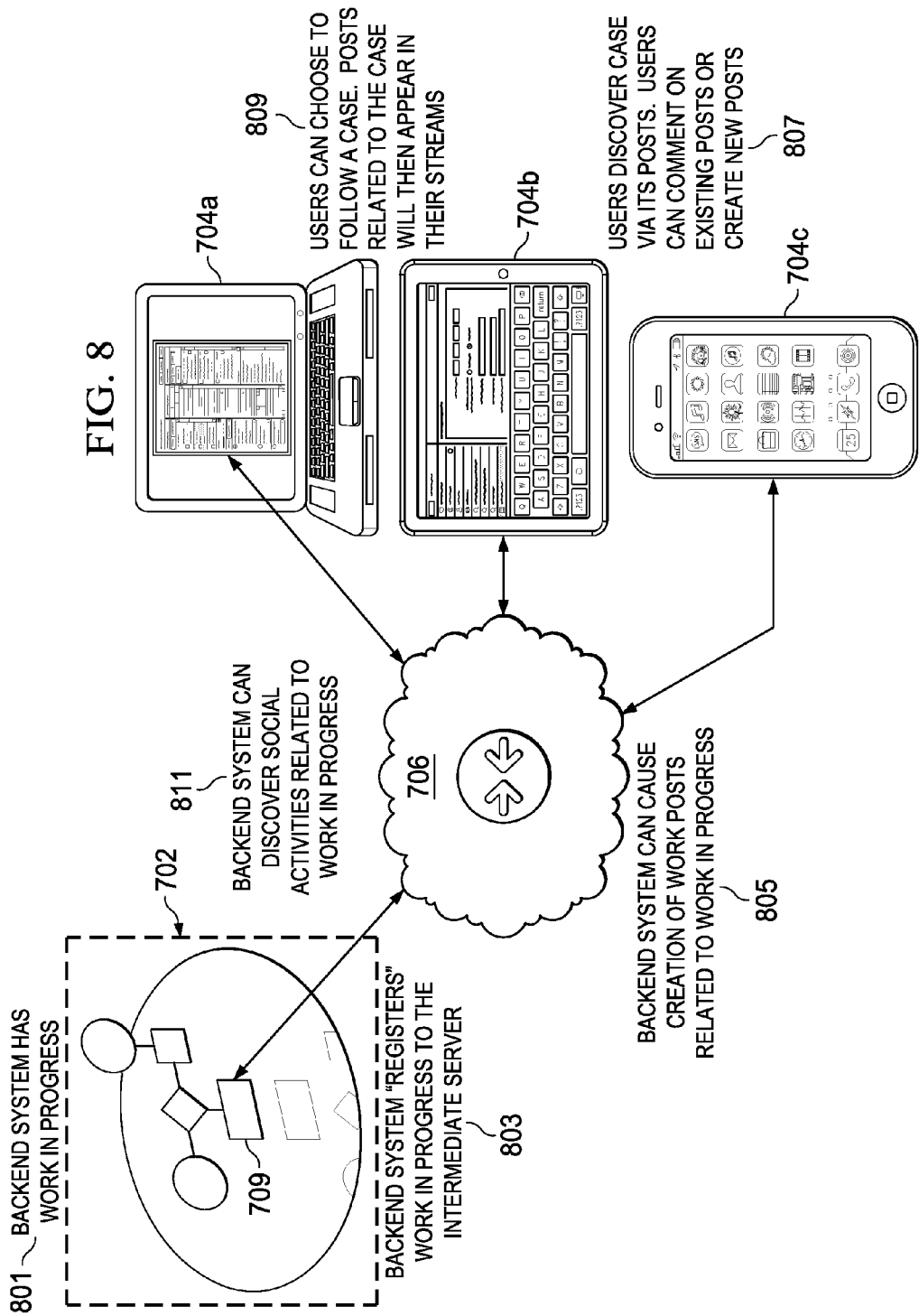

On the backend, as shown in FIG. 8, backend system 702 may have a work item or case that needs to be worked on (801). Backend system 702 may register the work item with intermediate server 706 (803). To do so, intermediate server 706 may maintain a data structure containing work order objects associated with work items (or cases or other units of work), each having a unique identifier assigned by backend system 702. This is further described below with reference to FIG. 10.

Additionally, backend system 702 may cause creation of work posts (805). For example, backend system 702 may determine that an expenses report has not been turned in for a work item and send a work order to intermediate server 706 (via handler 709). The work order may contain a form for the expenses report and a unique identifier identifying the work item. Other types of work orders may include, but are not limited to, notification of a new case, an update to a work item, etc. In response, intermediate server 706 may create and distribute work posts accordingly, for instance, by placing the work posts in selective event streams. Users may discover a case via a work post or work posts concerning same, and/or they may comment on existing posts or create new ones (807). In addition, users can follow a case and posts related to the case will then appear in their associated streams (809). These social activities (which may include interactions with and through the social client applications and/or social client modules running on client devices 704a-704c and which may be collectively referred to as events, such as events 214 shown in FIG. 2 and events 314 shown in FIG. 3) may be communicated to backend system 702. In this way, backend system 702 can discover social activities (e.g., posts, comments, followers, etc.) related to a work item or case (811). In some embodiments, such events may be monitored by backend system 702.

Figure 9:
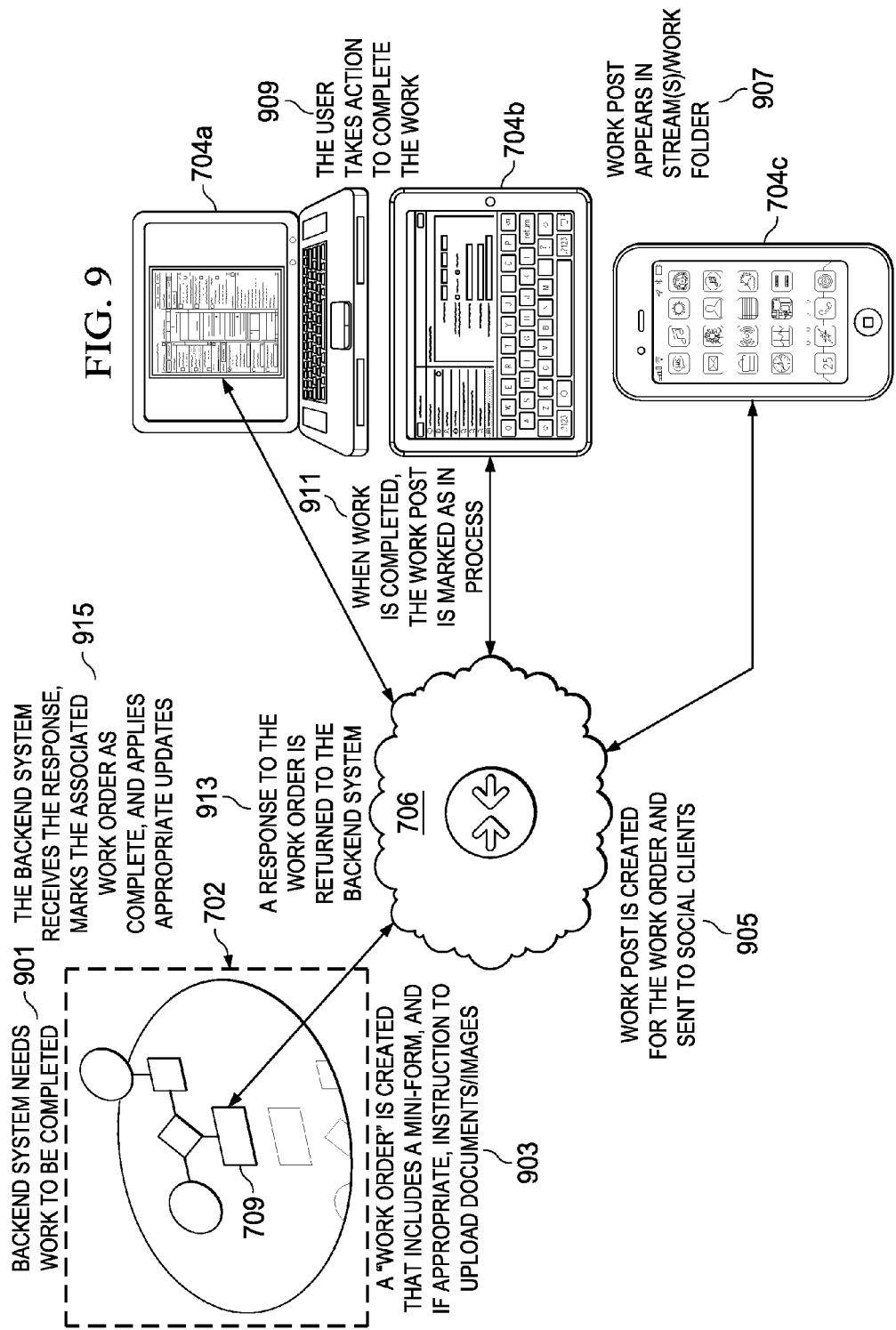

FIG. 9 illustrates by example how embodiments disclosed herein may significantly enhance a user's engagement with their work. For example, backend system 702 may need work to be completed (901). This may pertain to a variety of work, such as trouble tickets, automobile insurance claims, etc. Backend system 702 may create a work order that includes a form and, if appropriate, instructions to upload documents and/or images (903). Intermediate server 706 may receive the work order via handler 709, generate a work post based on the work order and send the work post to social clients, as appropriate (905). Intermediate server 706 may create and store a work order object associated with the work order to keep track of posts, comments, documents, files, etc. associated with the work object. The work order may contain information identifying user(s), topic(s), group(s), etc. Social clients running on client devices 704a-704c may receive the work post and place the work post in event stream(s) and/or work folder(s) associated with the user(s), topic(s), group(s), etc. (907). Suppose a user is a field agent identified in the work order, the field agent may select the work post from their event stream or work folder, which opens up the form associated with the work post. The field agent may respond to the work post by performing necessary action(s) such as filling out the form and, per the instructions in the work post, attaching a required image (909). The field agent may submit the completed form and attachment. The submitted information is received by intermediate server 706 which, in turn, marks the associated work post as in process (911). Intermediate server 706 returns a response to the corresponding work order to backend system 702 (913) and updates its work order object accordingly. Backend system 702 receives the response, marks the associated work order as complete, and applies appropriate updates accordingly (e.g., updating a list of forms associated with an automobile insurance claim to indicate that the particular form has been completed by the field agent) (915). The updates, in turn, can be viewed on the field agent's stream.

Figure 10:
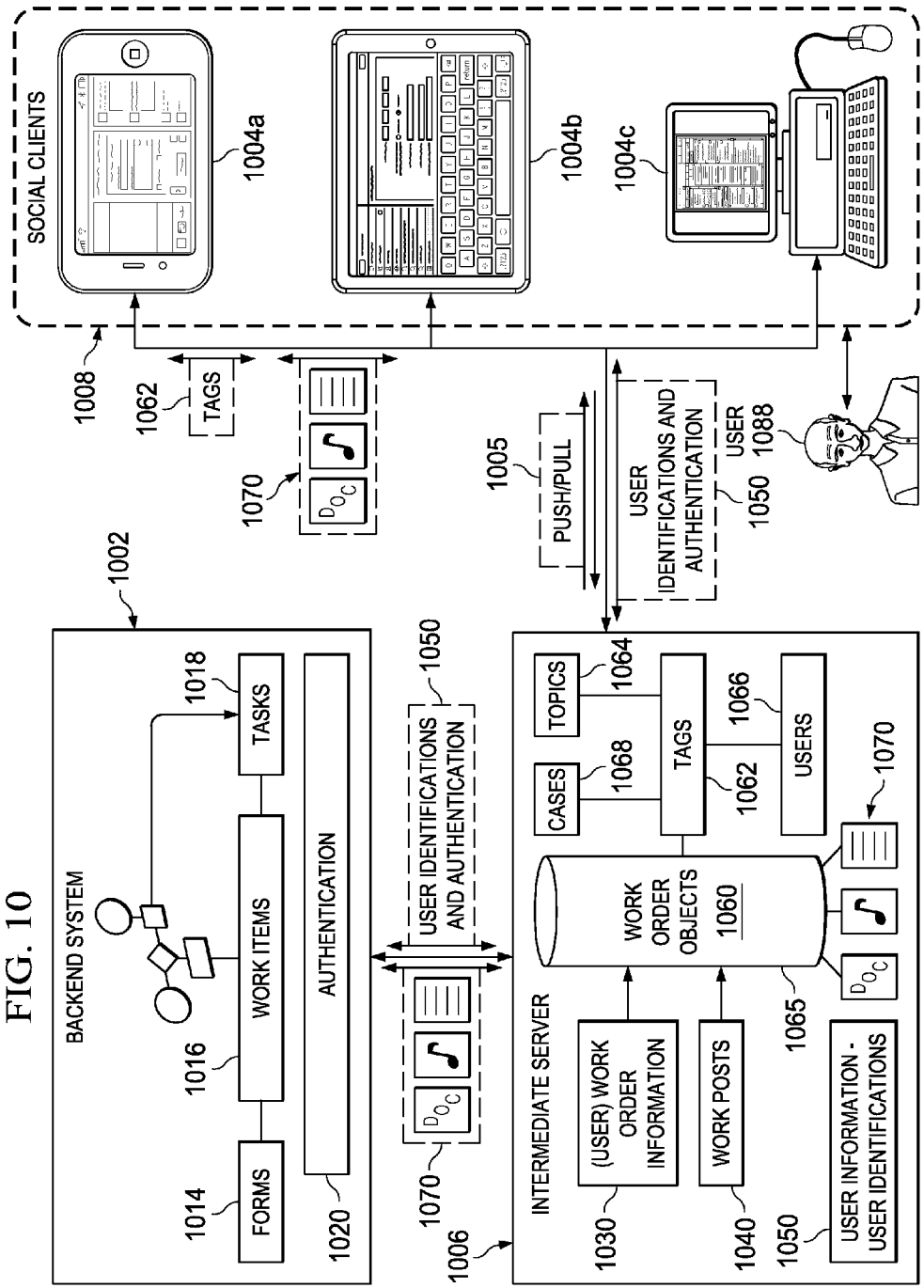
FIG. 10 depicts a diagrammatic representation of an example system architecture according to some embodiments disclosed herein.

FIG. 10 depicts a diagrammatic representation of an example system architecture according to some embodiments disclosed herein. In this example, backend system 1002 may manage work items 1016 (e.g., cases, projects, jobs, assignments, etc.) and communicatively connected to intermediate server 1006 via authentication means 1020. Work items 1016 may have associated tasks 1018 and forms 1014.

Backend system 1002 may send work orders to intermediate server 1006 as described above. Intermediate server 1006 may communicate with backend system 1002 regarding user identifications and authentication 1050, as well as information on forms 1014, work items 1016, tasks 1018, etc. In some embodiments, intermediate server 1006 may store user information 1050 for a set of users, the user information including user identification information that can be authenticated by backend system 1002, intermediate server 1006, and social clients 1008. This allows intermediate server 1006 to control and coordinate work order information 1030 for review and input by authorized users only. Authentication means 1020 may authenticate user identification information to enable authentication of a particular user on backend system 1002, intermediate server 1006, and client device(s) 1004a-1004c.

For each work order, intermediate server 1006 may instantiate a work order object 1060 to assist the control and completion of the work order (by a user or multiple users). Work order objects 1060 instantiated by intermediate server 1006 may be stored in data storage 1065. Data storage 1065 may also store work order information 1030, work posts 1040, content objects 1070, and tags 1062 associated with work order objects 1060. Tags 1062 may be associated with topics 1064, users 1066, and/or cases 1068. There can be various types of tags. For example, a work id tag may identify a particular case, while a user tag may enable intermediate server 1006 to notify the tagged user regarding updates to the case. Such a notification may be sent to the user via a work post.

To complete a work order from backend system 1002, intermediate server 1006 may create and send work post 1040 to one or more social clients 1008 running on client devices 1004a-1004c. Note that intermediate server 1006 does not segregate parts of a work order—the whole form associated with the work order is presented. However, in some cases, only certain parts are returned to backend system 1002 by intermediate server 1006 in a response to the work order. For example, form elements without values are not returned, and unselected options are not returned. Additionally, work post 1040 sent to social client(s) 1008 may include tags 1062 and/or one or more content objects 1070 (e.g., an image, an audio file, a document, etc.) associated with the work order.

Intermediate server 1006 processes work order information 1030 exchanged between work order object 1060 and social clients 1004a-1004c. Specifically, work order form 1014 may be sent to intermediate server 1006 as part of a work order and, subsequently, sent to one or more social clients 1004a-1004c as part of work post 1040. User 1088 may provide work order information 1030 using work order form 1014 via social client module or application 1008, as described above.

As those skilled in the art will appreciate, there can be multiple work order forms associated with a work order. Within this disclosure, a form can be considered a collection of "form elements," each of which are a graphical user interface (GUI) representation of some piece of data (e.g., one form element may be a date picker, while another form element may be a file upload control, etc.). Information to and from a work order form may include data (which may or may not be required) for a particular form element if user input is required.

Intermediate server 1006 may store work order information 1030 received from user 1088 and send at least a portion of work order information 1030 to backend system 1002 to complete the work order. The work order information sent to backend system 1002 may include an image associated with the work order, an audio message associated with the work order, a text message associated with the work order, and/or a document associated with the work order. Indeed, a file of any type (collectively referred to as content objects 1070) may be uploaded and associated with the work order.

In some embodiments, social clients 1008 may be configured to pull one or more work posts 1040 from intermediate server 1006. In some embodiments, intermediate server 1006 may be configured to send/receive (push/pull 1005) data such as work posts 1040, user information 1050, etc. to/from one or more social clients 1008 running on client devices 1004a-1004c to initiate and/or facilitate the processing or creation of a work order.

Each of social clients 1008 may have a set of interactive tools having various features and/or functions to facilitate users to view, engage, collaborate, and complete various work items as described above. In this context, social clients 1008 may be referred to as work order assistance modules in some embodiments.

Figure 11:
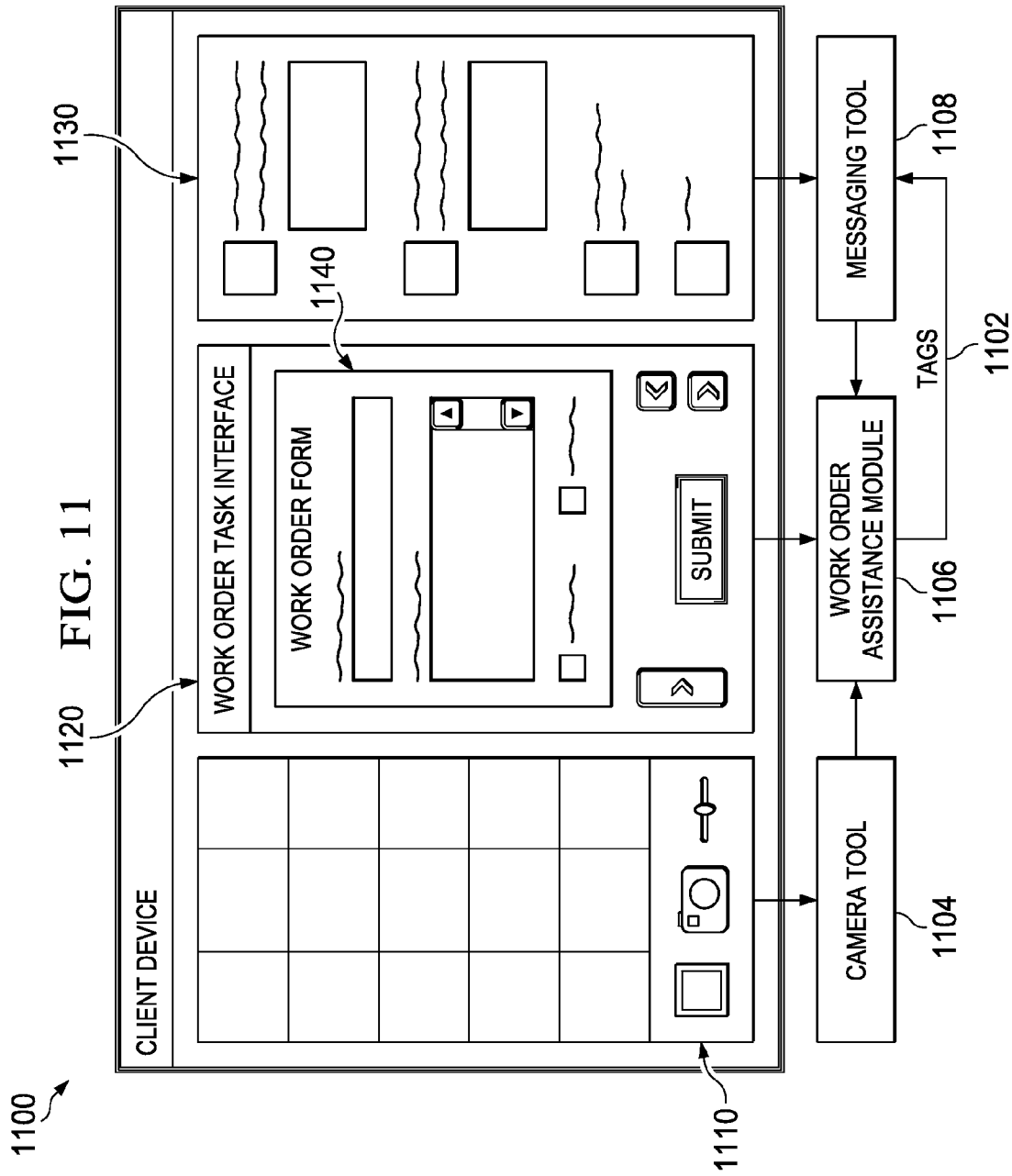
FIG. 11 depicts a diagrammatic representation of an example user device according to some embodiments disclosed herein.

An exemplary client device implementing an embodiment of a work order assistance module is shown in FIG. 11. Client device 1100 may include a processor, a camera, and non-transitory computer memory storing instructions executable by the processor to implement menu item controls 1110 including camera tool 1104, work order assistance module 1106, and messaging tool 1108. Work order assistance module 1106 may implement work order task interface 1120 for displaying work order form 1140 for receiving work order inputs. As an example, a user may employ camera tool 1104 to capture an image. The image may be that of a damaged automobile for processing an insurance claim. Work order assistance module 1106 may aide the user in inputting and/or adding information associated with the captured image into work order form 1140. Work order assistance module 1106, which may be coupled to an intermediate server (e.g., intermediate server 1006 described with reference to FIG. 10), may assist in the completion of various work orders and/or steps. Messaging tool 1108 may be used to send/receive messages to/from various users, using tags 1102, to further aide in the processing, controlling, and information gathering among and between users and in-association with the work order. Messages received by messaging tool 1108 may appear in stream 1130.

Embodiments disclosed herein can provide many advantages. For example, embodiments can enable the integration of highly useful social interaction tools with enterprise backend application systems, providing access to and control over associated enterprise content and information for the workflow and logic needed to control a work order.

To continue with the automobile insurance claim example described above, the field agent may inform the case manager, using the messaging, commenting, or posting function of the social interaction tools, that the image(s) of the damaged automobile has/have been uploaded for review and processing. From the perspective of the field agent, this step is intuitive and easy as if the field agent were interacting with a social networking site. However, input to the messaging, commenting, or posting function of the social interaction tools is received by an intermediate server in order to transform the input from the field agent and document the fact that the field agent has completed image upload. The intermediate server communicates this event with an appropriate backend system so that the next step of the claim process may be initiated. The intermediate server may manage the exchange of workflow information (for example, the captured images) to and from client device(s) where the workflow information may be generated, thereby reducing the workload of enterprise backend systems which process the information and which control the next step or requirement needed to continue the work order.

These, and other, aspects of the disclosure and various features and advantageous details thereof are explained more fully with reference to the exemplary, and therefore non-limiting, embodiments illustrated and detailed in the accompanying appendices. It should be understood, however, that the detailed description and the specific examples, while indicating the some embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive subject matter will become apparent to those skilled in the art from this disclosure, including the accompanying appendices.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system, comprising:
   a social client module embedded in an application embodied on a non-transitory computer readable medium of a client device, wherein the application is a client of a backend system; and
   an intermediate server communicatively connected to the social client module embedded in the application executing on the client device and to one or more backend systems running on one or more server machines, wherein the social client module is a client of the intermediate server, the intermediate server configured for:
      receiving a work order from the backend system over a network, the work order containing a form;
      instantiating a work order object to assist in controlling, tracking, and completing the work order;
      storing the work order object instantiated by the intermediate server in a data storage at the intermediate server;
      generating a work post for the work order, the work post associated with the form contained in the work order received from the backend system;
      sending the work post over the network to the social client module executing on the client device, wherein the social client module displays the work post on the client device, collects user inputs via the work post, and sends the user input to the intermediate server;
      receiving the user input from the social client module embedded in the application executing on the client device;
      updating the work order object stored in the data storage to reflect the user input collected by the social client module via the work post generated by the intermediate server and displayed on the client device;
      preparing a response to the work order based on the user input received from the social client module embedded in the application executing on the client device; and
      sending the response to the work order to the backend system over the network.

2. The system of claim 1, wherein the work order contains a tag referencing a work item assigned by the backend system, wherein the work post created by the intermediate server is associated with the tag, and wherein the user input received from the social client module is associated with the tag.

3. The system of claim 2, wherein the work order contains references to at least one of a case, a person, a topic, or a group.

4. The system of claim 1, wherein the social client module includes a set of features for following, tagging, posting, or commenting on a work item managed by the backend system.

5. The system of claim 1, wherein the social client module is configured for displaying a stream containing a plurality of posts, the plurality of posts including at least one work post generated by the intermediate server, and wherein the social client module is further configured for sending a response to the work post to the intermediate server.

6. The system of claim 1, wherein the intermediate server is configured for managing tags associated with work items managed by the backend server system.

7. The system of claim 1, wherein the application is hosted on the backend system and wherein the social client module is displayed on the client device as part of the application hosted on the backend system.

8. The system of claim 1, wherein the social client module executes on the client device independently of the backend system.

9. A work order processing system, comprising:
a backend system configured to generate a work order, the backend system running on one or more server machines, the work order including a form; and
an intermediate server coupled to the backend system and to a social client module embedded in an application executing on a client device, wherein the application is a client of the backend system, the intermediate server configured to:
receive a work order from the backend system over a network,
instantiate a work order object to assist in controlling, tracking, and completing the work order,
storing the work order object instantiated by the intermediate server in a data storage at the intermediate server,
generate a work post associated with the work order, the work post associated with the form contained in the work order received from the backend system,
send the work post over the network to the social client module executing on the client device, wherein the social client module displays the work post on the client device, collects user inputs via the work post, and sends the user input to the intermediate server,
receive the user input to from the social client module embedded in the application executing on the client device,
update the work order object stored in the data storage to reflect the user input collected by the social client module via the work post generated by the intermediate server and displayed on the client device,
prepare a response to the work order based on the user input received from the social client module embedded in the application executing on the client device, and
send the response to the work order to the backend computing system over the network.

10. The work order processing system of claim 9, wherein the work order contains a tag referencing a work item assigned by the backend system, wherein the work post created by the intermediate server is associated with the tag, and wherein the user input received from the social client module is associated with the tag.

11. The work order processing system of claim 10, wherein the work order contains references to at least one of a case, a person, a topic, or a group.

12. The work order processing system of claim 9, wherein the social client module includes a set of features for following, tagging, posting, or commenting on a work item managed by the backend system.

13. The work order processing system of claim 9, wherein the social client module is configured for displaying a stream containing a plurality of posts, the plurality of posts including at least one work post generated by the intermediate server, and wherein the social client module is further configured for sending a response to the work post to the intermediate server.

14. The work order processing system of claim 9, wherein the intermediate server is configured for managing tags associated with work items managed by the backend server system.

15. The work order processing system of claim 9, wherein the application is hosted on the backend system and wherein the social client module is displayed on the client device as part of the application hosted on the backend system.

16. The work order processing system of claim 9, wherein the social client module executes on the client device independently of the backend system.

17. A method for processing work orders using information exchanged between a backend server, an intermediate server, and a social client module embedded in an application executing on a client devices, the method comprising:
at the intermediate server:
instantiating a work order object to assist in controlling, tracking and completing a work order, responsive to receiving a work order from the backend server over a network, the work order including a form;
storing the work order object instantiated by the intermediate server in a data storage at the intermediate server;
generating a work post for the work order, the work post associated with the form contained in the work order received from the backend system;
sending the work post over the network to the social client module embedded in the application executing on the client device, wherein the application is a client of the backend system, wherein the social client module is a client of the intermediate server, and wherein the social client module displays the work post on the client device, collects user inputs via the work post, and sends the user input to the intermediate server;
receiving the user input to the form from the social client module embedded in the application executing on the client devices;
updating the work order object stored in the data storage to reflect the user input collected by the social client module via the work post generated by the intermediate server and displayed on the client device;
preparing a response to the work order based on the user input received from the social client module embedded in the application executing on the client devices; and
sending the response to the work order to the backend system over the network.

18. The method of claim 17, wherein the work order contains a tag referencing a work item assigned by the backend system, wherein the work post created by the intermediate server is associated with the tag, and wherein the user input received from the social client module is associated with the tag.

19. The method of claim 17, wherein the work order contains references to at least one of a case, a person, a topic, or a group.

20. The method of claim 17, the intermediate server further managing tags associated with work items managed by the backend system.

* * * * *